M. F. COX.
POWER REVERSE GEAR FOR LOCOMOTIVES.
APPLICATION FILED OCT. 3, 1916.
1,231,855.
Patented July 3, 1917.
2 SHEETS—SHEET 1.
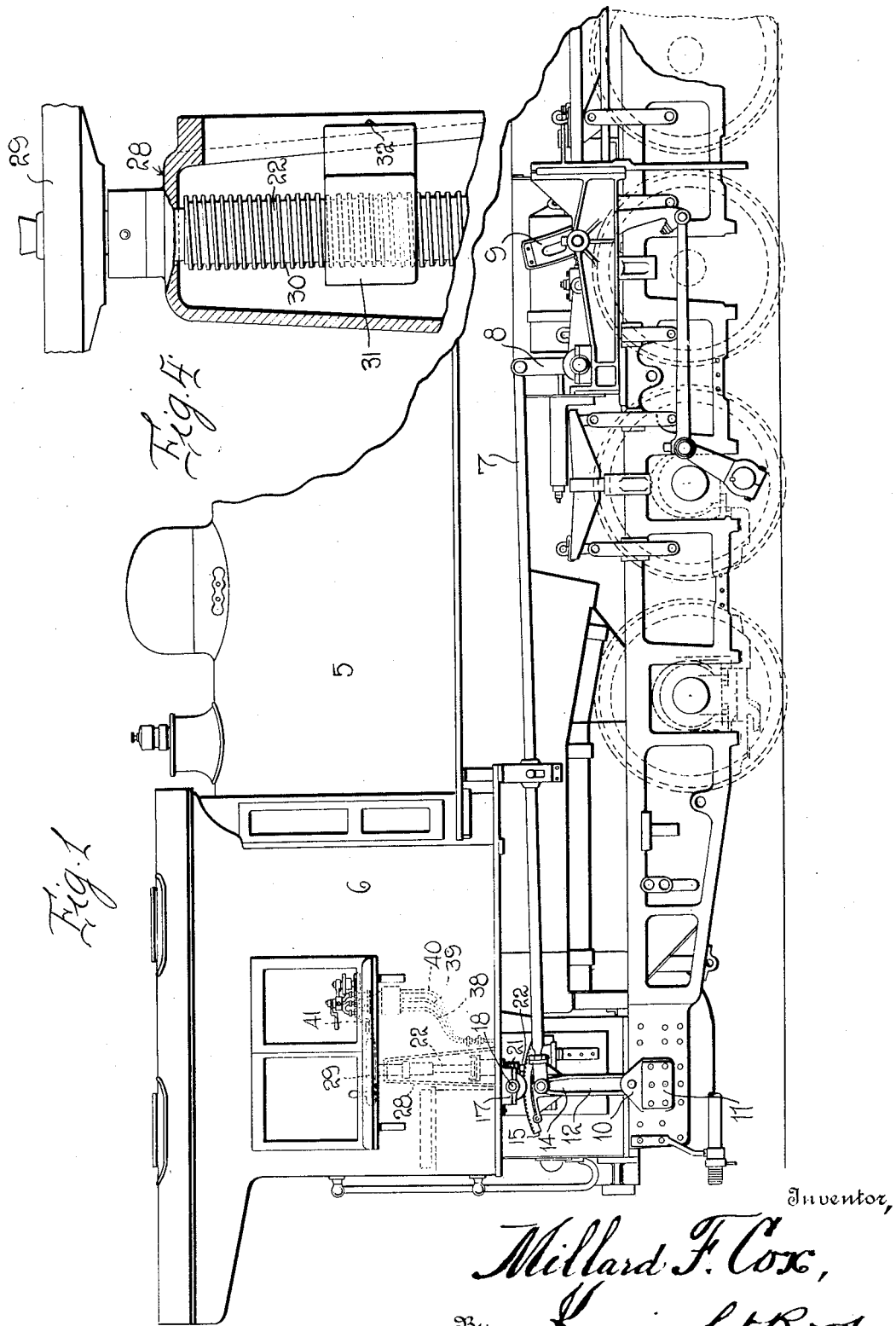
Inventor,
Millard F. Cox,
By Knight Bros
Attorneys

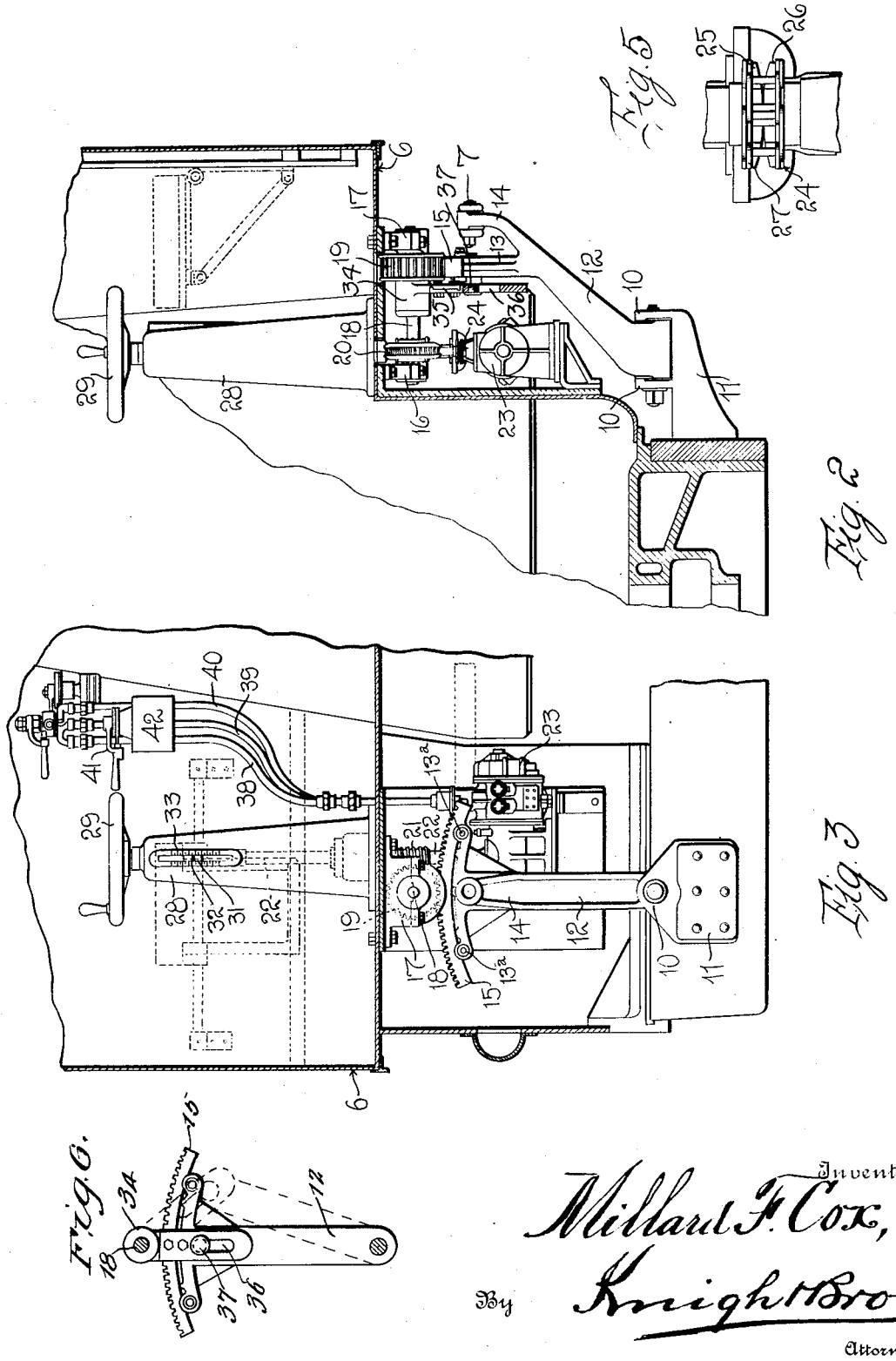

UNITED STATES PATENT OFFICE.

MILLARD F. COX, OF LOUISVILLE, KENTUCKY.

POWER REVERSE-GEAR FOR LOCOMOTIVES.

1,231,855.  Specification of Letters Patent.  Patented July 3, 1917.

Application filed October 3, 1916. Serial No. 123,536.

*To all whom it may concern:*

Be it known that I, MILLARD F. COX, a citizen of the United States of America, residing at Louisville, in the county of Jefferson and State of Kentucky, have invented certain new and useful Improvements in Power Reverse-Gears for Locomotives, of which the following is a specification.

The invention relates to a power reverse gear for locomotives. Because of the greatly increased size of modern locomotives, it has become difficult to reverse them by hand. It sometimes requires the strength of two or more men to bring the ordinary reverse lever of a modern locomotive to the required notch. When it is reflected that in shifting engines, the operation of reversing has to be performed very frequently, the desirability of providing some means whereby this operation may be effected by power will be readily apparent. It is, therefore, the primary object of the present invention to provide a reverse gear for locomotives constructed in such manner that it may be operated by power.

I am aware of the fact that it has heretofore been proposed to operate the reverse mechanism of a locomotive by power but as this description proceeds, it will be seen that the present invention provides marked improvements in devices of this nature in that it consists of relatively few parts so correlated as to secure a quick and certain movement of the reverse gear, while at the same time, the said reverse gear will be fixedly held in any position to which it may be shifted. It will also be seen that means are provided to enable the engineer to note the point of "cut-off" of the valves so that the most economical results in the operation of the locomotive may be secured. In the preferred embodiment of the invention, air from the air supply line of the locomotive is employed to drive a pneumatic motor which operates a small pinion through the medium of interposed worm gearing. Said small pinion engages a large segmental gear through which the reverse rod is connected. By virtue of this arrangement such a ratio of gearing is established between the motor and the segmental gear that but little air is required to operate the motor and an easy but powerful action of the parts is secured.

Further objects and advantages of the invention will be set forth in the detailed description which now follows:

In the accompanying drawing

Figure 1 is a partial side elevation of a locomotive having the invention applied thereto.

Fig. 2 is a partial transverse, vertical, sectional view through the locomotive cab illustrating the reverse gearing in elevation.

Fig. 3 is a partial longitudinal sectional view through the locomotive cab illustrating the reverse gearing in side elevation.

Fig. 4 is a vertical sectional view through a stand hereinafter described illustrating the vertical drive shaft in elevation, and Fig. 5 is a detail view of a releasable clutch interposed between the pneumatic motor and the vertical drive shaft.

Fig. 6 is a detail sectional view of the throw limiting device.

Like numerals designate corresponding parts in all of the figures of the drawing.

Referring to the drawing 5 designates the boiler and 6 the cab of a locomotive. The reach rod of the locomotive is indicated at 7 and is connected through the medium of a bell crank lever 8, with the usual reverse link 9. These parts are of the usual and well-known construction and require no further description, the invention residing more particularly in the means for imparting movement to the reach rod 7. Journaled in bearings 10 of a bracket 11 carried by the lower part of the engine frame is an oscillatory arm comprising a body portion 12 and forks or branches 13 and 14. The rear end of the reach rod 7 is pivotally connected to the upper end of the branch 14 while the branch 13 carries a gear segment 15. Mounted in brackets 16 and 17 depending from the under side of the overhang of the cab, is a shaft 18. A shrouded pinion 19 is fast upon the shaft and meshes with the gear segment 15. A worm wheel 20 is fast upon the shaft 18 and derives movement from a worm 21 that is carried by a vertical, rotative shaft 22. Rotation is imparted to the shaft 22 by a pneumatic motor 23. The detail construction of this motor is of no moment as far as the present invention is concerned. Motors of this character are well-known and are on sale in the market and any desired type of pneumatic motor may be employed. I preferably provide a releasable clutch 24 between the motor 23 and the vertical drive shaft 22 because the invention contemplates the provision of means whereby the mechanism may be actuated by hand if for any reason the motor 23 fails to operate. By referring to Fig. 5, it will be seen that this clutch or coupling comprises two thin flanges 25 and 26 between which a short circular chain 27 similar to that used for noiseless belt driving, is interposed. In addition to providing means for disconnecting the motor from the vertical drive shaft, this coupling gives the motor a little freedom in starting so that the motor gets a start before the entire load comes thereon. The upper end of the vertical drive shaft 22 is journaled in the upper end of a stand 28. Shaft 22 carries a hand wheel 29 by means of which rotation may be manually imparted to the said shaft. This drive shaft 22 is threaded at 30 for engagement with a traveling nut 31. A pointer 32 carried by this nut moves over a graduated indicating surface 33. The position of the pointer 32 with relation to the graduated indicating surface 33 provides means to enable the engineer to tell at what point the engine is "cutting-off". A sleeve 34 is loosely journaled upon the shaft 18 and carries a two part depending arm 35 which is slotted at 36 for the reception of a stud 37 projecting rearwardly from the branch 13 of the arm 12. The length of this slot 35 determines the throw of which the arm 12 will be capable, prevents overthrow of the parts and definitely limits the movement that may be imparted to the segmental gear 15 by the pinion 19. The motor 23 is supplied with the necessary motive fluid through pipes 38, 39 and 40 from the air brake supply line of the locomotive. A controlling handle 41, of a valve 42, when moved in one direction supplies air to the motor 23 to drive it in one direction and when moved in the opposite direction reverses the movement of the motor. It is apparent, therefore, that when the motor 23 is set in operation, rotation will be imparted to shaft 22 and through worm 21 and worm wheel 20, to shaft 18. This will in turn cause rotation of the pinion 19 and impart movement in the desired direction to the gear segment 15, arm 12 and reach rod 7. The worm wheel 20 and worm 21 constitute a self-locking mechanism so that no amount of thrust through the reach rod can disturb the adjusted position of the parts.

While I have illustrated a pneumatic motor 23 as the actuating means for the reverse gear, it is to be understood that the invention is not limited in this respect because a small turbine steam engine or even an electric motor could be substituted for the pneumatic motor without departure from the invention.

While the gear segment 15 is carried by the branch 13 of arm 12, this gear segment is preferably separable from said branch and is held in position thereon by means of fastenings indicated at 13ª. By virtue of this construction, these gear segments may be readily detached from the branch 13 and others substituted therefor. This is a feature of advantage in effecting repairs.

It is to be understood that the invention is not limited to the precise construction set forth but that it includes within its purview such changes as fairly come within the spirit of the appended claims.

Having described my invention what I claim is:—

1. A device of the character described comprising a reach rod, a toothed sector to which said reach rod is directly connected, a pinion engaging said toothed sector, a motor and a worm drive between said motor and said pinion.

2. In a mechanism of the character described, the combination with an oscillatory arm of a reach rod connected thereto, a segmental gear carried by said oscillatory arm, a pinion meshing with said segmental gear, a motor and a worm drive between said motor and said pinion.

3. In a mechanism of the character described, the combination with an oscillatory arm of a reach rod connected thereto, a segmental gear carried by said oscillatory arm, a pinion meshing with said segmental gear, a motor and a worm drive between said motor and said pinion, a swingingly mounted slotted arm, and a connection between said arm and the oscillatory arm, said connection traveling in the slot of the swinging arm as and for the purposes set forth.

4. In a device of the character described, the combination with a toothed sector of a reach rod connected thereto, a pinion meshing with said toothed sector, a motor, a vertical drive shaft to which said motor imparts movement, a worm upon the drive shaft, a worm wheel with which the worm meshes and a shaft upon which both the worm wheel and the pinion are mounted.

5. In a device of the character described, the combination with a toothed sector of a reach rod connected thereto, a pinion meshing with said toothed sector, a motor, a vertical drive shaft to which said motor imparts movement, a worm upon the drive shaft, a worm wheel with which the worm meshes, a shaft upon which both the worm wheel and the pinion are mounted and manually operable means for actuating said vertical drive shaft.

6. The combination with a toothed sector, a reach rod connected thereto, a pinion engaging the toothed sector, a motor, a worm gearing between the motor and the pinion and manually operable means for actuating one of the members of the worm gearing.

7. In a device of the character described, the combination with a toothed sector, a reach rod connected thereto, a pinion meshing with said toothed sector, a shaft upon which the pinion is mounted, a motor, a worm gear connection between the motor and the shaft and comprising a vertical drive shaft and an indicating member to which movement is imparted from said vertical drive shaft.

8. In a device of the character described, the combination with a toothed sector, a reach rod connected thereto, a pinion meshing with said toothed sector, a shaft upon which the pinion is mounted, a motor, a worm gear connection between the motor and the shaft and comprising a vertical drive shaft, an indicating member to which movement is imparted from said vertical drive shaft and a hand wheel mounted upon the vertical drive shaft.

9. The combination with a locomotive and its cab of bearings mounted thereon beneath the overhang of the cab, a shaft journaled in said bearings, a motor, a vertical drive shaft projecting into the cab, worm gearing between the vertical drive shaft and the first named shaft, a segmental gear, a pinion meshing with said segmental gear and mounted upon the first named shaft and manually operable means upon the vertical drive shaft within the cab whereby rotation may be imparted to said drive shaft from within the cab.

10. The combination with a locomotive and its cab of bearings mounted thereon beneath the overhang of the cab, a shaft journaled in said bearings, a motor, a vertical drive shaft projecting into the cab, a worm gearing between the vertical drive shaft and the first named shaft, a segmental gear, a pinion meshing with said segmental gear and mounted upon the first named shaft, manually operable means upon the vertical drive shaft within the cab whereby rotation may be imparted to said drive shaft from within the cab and an indicating mechanism actuated from the vertical drive shaft.

11. In a power reverse gearing, the combination with a movable toothed member, of a reach rod connected thereto, a toothed element meshing with said toothed member, a motor, a driving shaft actuated by said motor, a reducing gearing between the driving shaft and the toothed element and an indicating member mounted upon said driving shaft.

12. In a reverse gearing, the combination with a locomotive of a bearing thereon beneath the overhang of the cab, an oscillatory arm journaled in said bearing, a reach rod connected to said arm, a segmental gearing carried by said arm, bearings supported from the overhang of the cab, a shaft journaled in said bearings, a pinion carried by said shaft, a motor and a reducing gearing between the motor and said shaft.

13. In a power reverse gearing, the combination with an oscillatory arm, of a reach rod connected thereto, a motor, actuating connections between the motor and the oscillatory arm, a swingingly mounted arm movable in juxtaposition to the slotted arm and a pin and slot connection between the swinging arm and the oscillatory arm.

In testimony whereof the foregoing specification is signed at Louisville, Kentucky.

MILLARD F. COX.